United States Patent [19]

Bernhard

[11] Patent Number: 5,725,415
[45] Date of Patent: Mar. 10, 1998

[54] GRINDING MACHINE AND METHOD OF SHARPENING GRASS MOWER BEDKNIVES

[76] Inventor: Stephen G. Bernhard, Bilton Road, Rugby, Warwickshire CV 22 7DT, United Kingdom

[21] Appl. No.: 585,042

[22] Filed: Jan. 11, 1996

[30] Foreign Application Priority Data

Feb. 23, 1995 [GB] United Kingdom ............... 9403640

[51] Int. Cl.$^6$ ............................................. B24B 1/00
[52] U.S. Cl. ........................... 451/45; 451/141; 451/349; 451/419
[58] Field of Search ................... 451/45, 344, 349, 451/419, 421, 439, 160, 141

[56] References Cited

U.S. PATENT DOCUMENTS

| | | | |
|---|---|---|---|
| 463,676 | 11/1891 | Bachelder et al. . | |
| 1,183,224 | 5/1916 | Oswald . | |
| 1,432,193 | 10/1922 | Lancaster . | |
| 1,513,527 | 10/1924 | Arnold . | |
| 1,968,609 | 7/1934 | Madsen | 51/173 |
| 2,121,965 | 6/1938 | Himebaugh | 451/419 |
| 2,517,947 | 8/1950 | Walker | 51/26 |
| 2,522,960 | 9/1950 | Price | 51/26 |
| 2,554,676 | 5/1951 | Masterson | 51/26 |
| 2,568,236 | 2/1951 | Lewis et al. | 451/349 |
| 2,613,483 | 10/1952 | Lewis et al. | 51/173 |
| 2,747,344 | 5/1956 | Kickbush | 51/250 |
| 2,786,370 | 3/1957 | Osborn | 76/82.1 |
| 2,863,262 | 12/1958 | Turner et al. | 51/173 |
| 2,879,629 | 3/1959 | Machovec | 451/141 |
| 2,928,215 | 3/1960 | McDonald | 451/141 |
| 3,019,568 | 2/1962 | Sauers et al. | 451/349 |
| 3,866,362 | 2/1975 | Riach et al. . | |
| 3,996,818 | 12/1976 | Lindsay . | |
| 4,694,613 | 9/1987 | Bernhard | 451/141 |
| 5,062,322 | 11/1991 | Sinko | 76/82.1 |
| 5,159,784 | 11/1992 | Varner, Sr. et al. | 51/173 |
| 5,321,912 | 6/1994 | Neary | 451/141 |
| 5,371,977 | 12/1994 | Liner | 451/349 |

*Primary Examiner*—Robert A. Rose
*Assistant Examiner*—George Nguyen
*Attorney, Agent, or Firm*—Deveau, Colton & Marquis

[57] ABSTRACT

A portable grinding machine for grinding the bottom blade or bedknife of grass mowers. The grinding machine includes a rotary grinding wheel assembly arranged for linear motion, where the wheel assembly can adjust along the blade or bedknife and grind them.

11 Claims, 3 Drawing Sheets

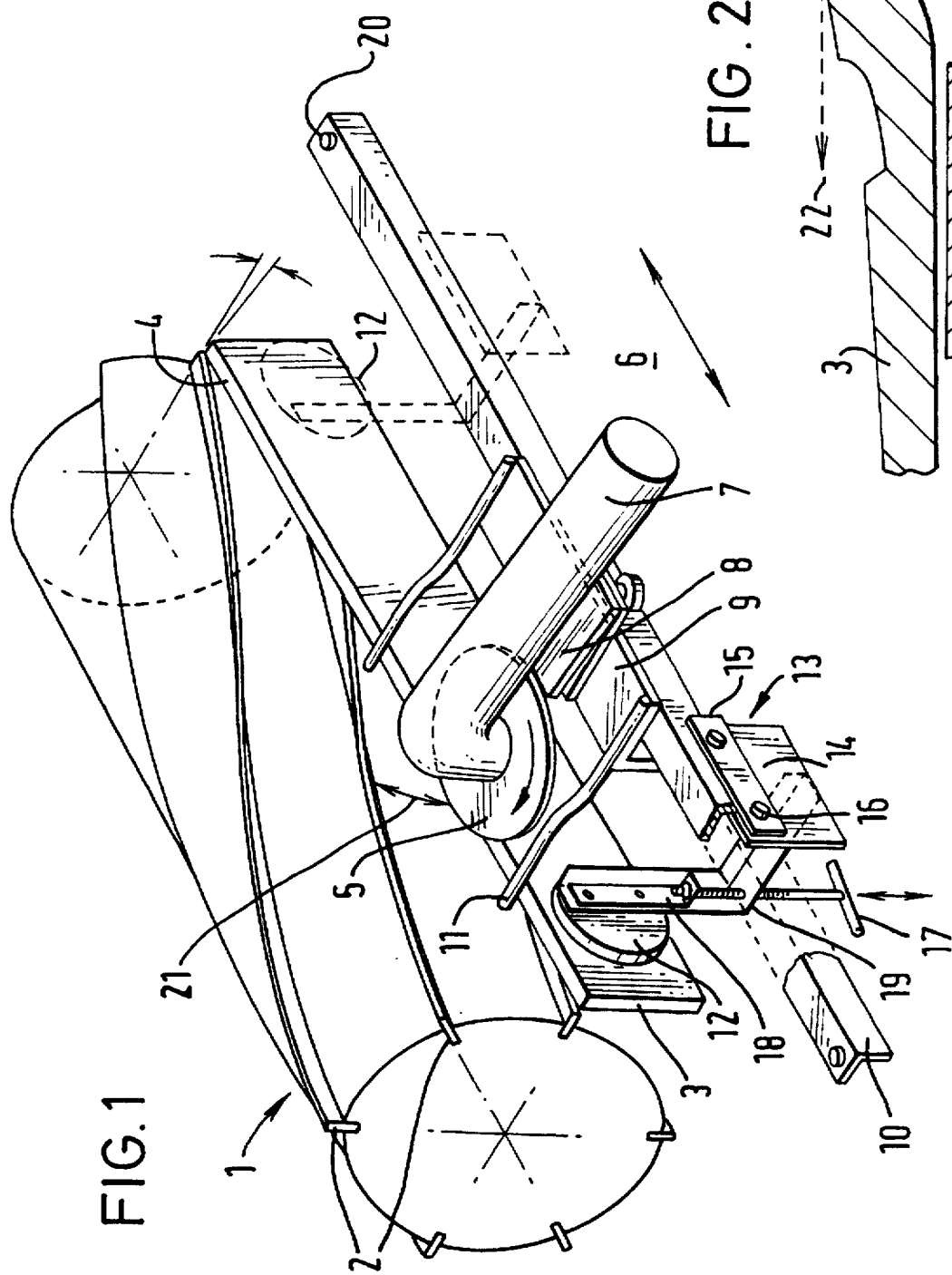
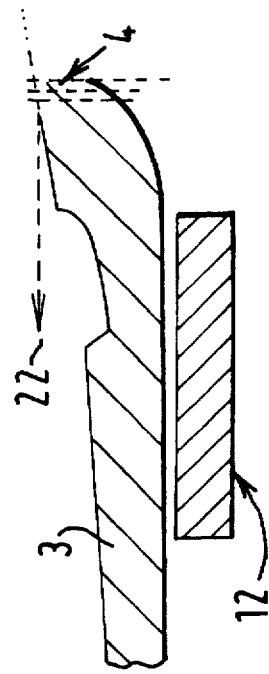

GRINDING MACHINE AND METHOD OF SHARPENING GRASS MOWER BEDKNIVES

TECHNICAL FIELD

The present invention relates to grinding machines, in particular grinding machines for grinding the bottom blade or bedknife of grass mowers of the type having a cylindrical cutting unit comprising blades in part helical form. The invention also provides a method of sharpening the bedknife of a reel mower.

Cylinder or reel mowers comprise one or more cylinders or reels bearing a plurality of part-helical blades and mounted for rotation about a horizontal axis transverse to the direction of motion of the mower. Each cylinder or reel cuts the grass in cooperation with an elongate bottom blade, commonly referred to as a bedknife, which is disposed in alignment with the reel and positioned for the grass to be positioned accurately allowing the helical blade to cut the grass in a transverse scything motion. The front face of the bedknife becomes worn during grass cutting and is required to be sharpened periodically by grinding.

BACKGROUND ART

Known bedknife grinders comprise a grinding wheel movable to and fro along a guide rail whilst rotating to grind the front face of a bedknife positioned in alignment with the guide rail. In order to grind the bedknife of a mower with such known machines, the bedknife must be removed from the mower and mounted on the grinder; alternatively the mower or, especially in the case of tractor mounted mowers, a disassembled part thereof, must be placed on the grinder.

Prior art bedknife grinders, therefore, have required the mowing machine or a part of the mowing machine to be taken to the grinder. Tractor mounted mowers, and often walking mowers, have had to be disassembled to permit the bedknife or a part of the mowing machine including the bedknife to be placed on the grinder.

U.S. Pat. No. 2,863,262 to Turner et al discloses a bed knife grinder and guide means therefor. The device is essentially a motorised grinder having a frame for engaging the bed knife and guiding the grinder along the edge of the bed knife. In operation, the grinder is applied to the bed knife and the guide means are adjusted to provide the desired depth of grinding. The grinder is then moved reciprocally along the bed knife to sharpen its edge.

U.S. Pat. No. 2,613,483 to Lewis et al discloses a lawn-mower sharpening device having a grinding wheel for sharpening the cutting reel blades and an angular guide for engaging the stationary cutting bar and maintaining the grinder in proper alignment as it is moved along the length of the blade.

U.S. Pat. No. 2,747,344 to Kickbush describes a portable lawn mower sharpener having a guide bar which may be removably mounted to the stationary cutting bar blade, thereby providing a track upon which a blade sharpening "dresser" may be moved reciprocally.

U.S. Pat. No. 1,968,609 to Madsen discloses a lawn-mower sharpening means for sharpening the cutting edges of the stationary and rotary knives of a reel-type lawnmower. This device is of the variety which requires that the stationary blade be removed from the mower prior to sharpening. The device includes a base platform onto which the blade is clamped, and which further includes guide means for the grinder.

GENERAL DISCUSSION OF INVENTION

The present invention seeks to provide a portable grinding machine for grinding a substantially linear blade incorporated in cutting apparatus, and to this end includes a rotary grinding wheel assembly arranged for reciprocal linear motion and means for adjustably but securely supporting the grinding machine to the cutting apparatus such that a grinding wheel of the assembly can move along the blade and grind it. The grinding machine can therefore be mounted on the cutting apparatus with the machine and the cutting apparatus in suitable relative disposition for grinding of the blade without prior disassembly or adjustment of the cutting apparatus, i.e. the blade can be ground whilst the cutting apparatus is in a complete and assembled state and no special changes or adjustments need to be made to the complete mower.

According to the invention, there is provided a portable grinder for grinding the bedknife of a grass mowing machine which grinder comprises a guide rail, a grinding wheel assembly for receiving a rotary grinding wheel which assembly is mounted for movement to and fro along said guide rail, readily releasable attachment members for releasably securing the grinder on the mowing machine such that when said grinding wheel assembly is moved along said guide rail the grinding wheel can move along a blade face of said bedknife and grind it, wherein said grinding wheel assembly includes deflector means for automatically deflecting rotary blades of said mowing machine out of the path of movement of said grinding wheel in both directions of movement relative to said guide rail during movement of said assembly, adjustment means being provided to adjust said guide rail adjacent its opposite ends relative to said bedknife and adjustment means being provided to adjust said grinding wheel assembly relative to said guide rail and hence relative to said blade face of said bedknife.

In one feature of this invention the means for adjusting attachment members may include means for varying the position of said attachment members in a first direction perpendicular to the longitudinal axis of the guide rail.

In another feature, said means for adjusting attachment members may include means for varying the position of said attachment members in a second direction perpendicular to the first direction.

In yet another feature said means for adjustment of said grinder wheel assembly may include means for rotationally displacing the grinder wheel assembly in a notional plane parallel to the longitudinal axis of the guide rail.

According to a further feature said means for adjustment of said grinder wheel assembly may include means for rotationally displacing the grinder wheel assembly in a notional plane perpendicular to the longitudinal axis of the guide rail.

In yet another feature the means for adjusting said grinder wheel assembly may comprise adjustment means in a first direction perpendicular to the longitudinal axis of the guide rail.

In another feature the means for adjusting said grinding wheel assembly may comprise adjustment means for displacing the grinder wheel assembly in a second direction perpendicular to the first direction.

In yet another feature the portable bedknife grinder may include adjustment means for varying the depth of grinding.

In a further feature said attachment means may comprise a plurality of magnets which are independently adjustable to alter the attitude of said guide rail.

According to another aspect of the invention, a method of sharpening the bedknife of a reel mower, comprising orienting the complete mower to expose the bedknife, attaching to the mower a portable grinder which comprises a guide rail, a grinding wheel assembly for receiving a rotary grinding wheel which assembly is mounted for movement to and fro along said guide rail, including the steps of adjusting attachment means to orientate said guide rail relative to said bedknife so that it is substantially parallel thereto and adjusting said grinding wheel assembly to introduce deflector means to operate between the bedknife and an adjacent rotary blade of the mower and to bring said grinding wheel into position so that blade face of said bedknife can be ground throughout its length during which grinding process said rotary blade automatically is deflected during movement of said grinding wheel assembly.

BRIEF DESCRIPTION OF DRAWINGS

The present invention is further described by way of example only, with reference to the accompanying drawings, in which:

FIG. 1 is a partial perspective view of a grinding machine according to the invention supported on a complete mowing machine; and FIG. 2 is a partial cross-sectional view of the grinding machine of FIG. 1, showing a magnetic attachment member of the mowing machine attached to the bedknife of the mowing machine.

FIGS. 1 and 2 show in partial view a bedknife grinder supported on a complete mowing machine for grinding of the bedknife thereof. They also illustrate a grinding machine for grinding a substantially linear blade incorporated in cutting apparatus, the grinding machine comprising a rotary grinding wheel arranged for reciprocal linear motion and means for adjustably but securely supporting the grinding machine on the cutting apparatus such that the grinding wheel can move along the blade and grind it.

EXEMPLARY MODE FOR CARRYING OUT THE INVENTION

Figure 3:
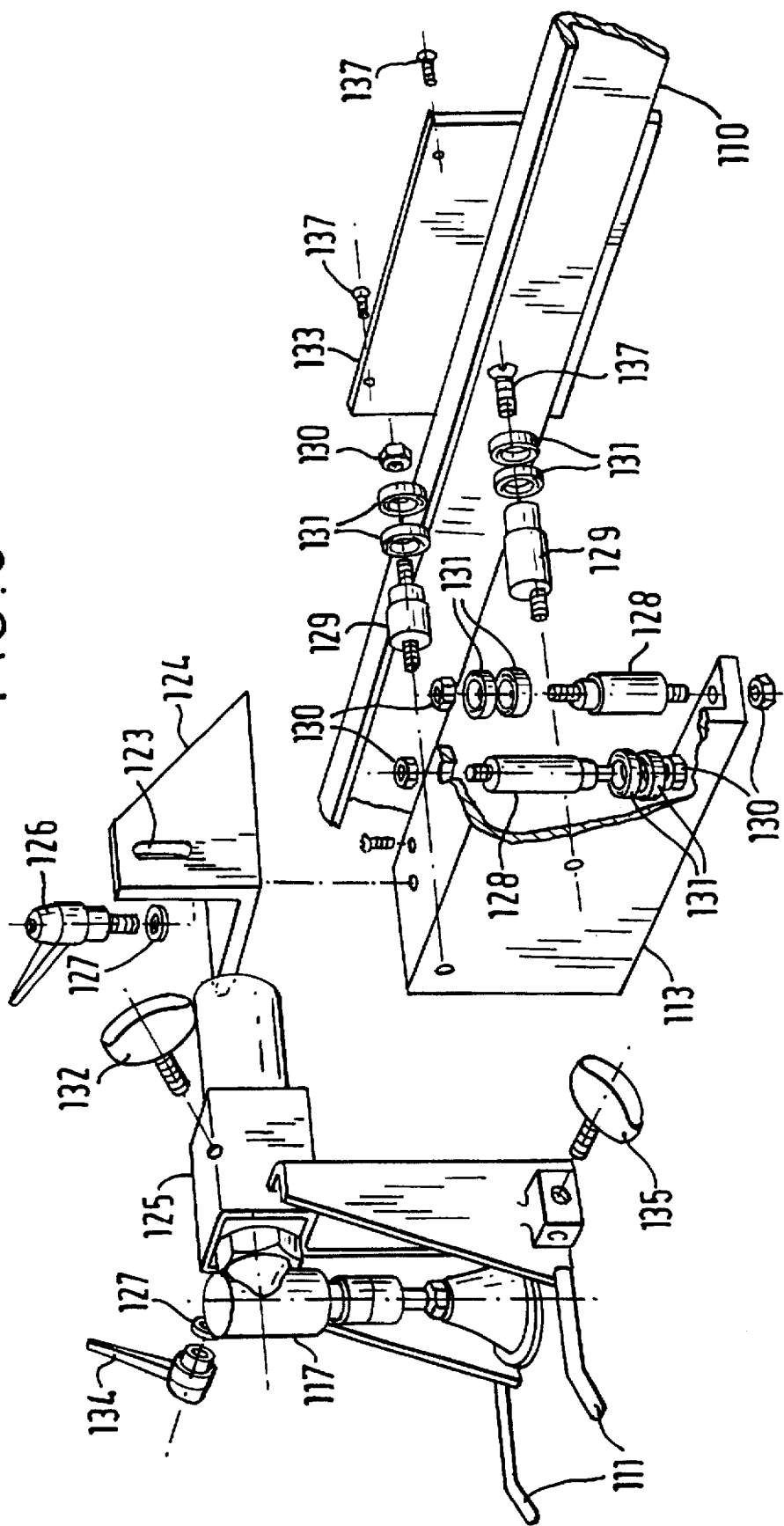
FIG. 3 is a partial perspective view of another embodiment of the invention detailing the components in their respective positions prior to assembly.

Referring to FIG. 1 in more detail, there is shown generally at 1 a reel of a reel mower, the reel being provided with a plurality of part helical blades 2. The mower also includes a bottom blade or bedknife 3, positioned such that in use grass is severed and cut by the blades 2 and held by the bedknife 3 at a front face 4 of the bedknife 3. In the illustrated embodiment, the mower is turned on its back on its frame (not shown), such that the underside of the mower and its bedknife 3 is exposed. The mower is in its complete, assembled state. For the sake of clarity, only the reel 1 and the bedknife 3 of the mower are shown. The invention allows for the mower to be so sharpened as not to require the mower head to be moved from its normal cutting position.

Also shown in FIG. 1 is part of a grinding machine for grinding the front face 4 of the bedknife 3. The grinding machine has a grinding wheel assembly comprising a rotary grinding wheel 5 arranged to traverse reciprocally along the front face 4 of the bedknife 3 in the directions indicated by a double arrow 6 and, as is well known in the art, grind the bedknife front face 4. The rotary grinding wheel 5, therefore, is coupled to rotary drive means, represented by a power unit 7 in FIG. 1.

The grinding wheel assembly normally includes means for adjusting the angle of the grinding wheel 5 relative to the bedknife front face 4. The angle adjustment means is illustrated in FIG. 1 by an angularly adjustable grinder support 8. The angularly adjustable grinder support 8 effects interconnection of the grinding wheel 5 with a traverse carriage 9, which is slidably supported by a guide rail 10 of the grinding machine. The grinder wheel 5 may be connected to the grinder support 8 by a frame and wing lock similar to the embodiment illustrated in FIG. 3. The guide rail 10 is shown to be in the form of an angle iron but in principle may have any desired cross-sectional profile. The grinding wheel assembly also includes a pair of blade deflectors 11.

It will be seen, therefore, that the grinding wheel assembly includes a carriage 9 slidable to and fro along the guide rail 10, which carriage 9 supports the rotary wheel 5. As shown, the grinding wheel assembly preferably also includes angular adjustment means for adjusting the angle of the grinding wheel 5 about an axis parallel with and normally close to the guide rail 10. In the illustrated embodiment, the angular adjustment means comprises the grinder support 8 comprising opposed inter hinged plates, one suitably attached to the traverse carriage 9 and the other suitably attached to the power unit 7 or other carrier for the grinding wheel 5. A double arrow 21 represents relative angular movement of the bedknife 3 and the grinding wheel 5.

It is not essential that the grinding machine have such a grinding wheel assembly; any suitable arrangement for providing a reciprocally linearly movable rotary grinding wheel may be used.

The guide rail 10 is supported in a frame (not shown) to which is suitably mounted a drive motor (not shown) for causing reciprocal movement of the traverse carriage 9 along the guide rail 10. Those skilled in the art will be familiar with drive mechanisms for the traverse carriage of a bedknife grinder and, as an example of such a system, there may be mentioned chain drives driven by electric motors. Limit stops 20 are provided at the opposed end regions of the guide rail 10, if desired.

The grinding machine is releasably supported on the mowing machine when in use. To this end, the grinding machine is provided with mounting or attachment means 12 for mounting or attaching the grinding machine to the mower. The attachment means 12 may comprise any device capable of releasably coupling the grinding machine to the mowing machine. In the illustrated embodiment, the attachment means comprises a pair of spaced apart strong permanent magnets 12. It is convenient for the magnets or other attachment means 12 to be arranged to be mounted on the bedknife 3 in such a way that they do not interfere with the front face 4. Thus, as shown, the grinding machine may be provided with one or more magnets 12 arranged for attachment to the bottom face of the bedknife 3. In other embodiments, the grinding machine is provided with attachment means arranged for mounting on other parts of the mowing machine. As alternatives to the illustrated magnets 12, the attachment means may be mechanical fixing means, for example bolts, brackets or clamps.

For purposes of stability, it is preferred that a plurality of spaced attachment members or magnets 12 be provided. The number of attachment members may be two, as shown in FIG. 1. In this way the guide rail and hence the path of movement of the grinding wheel can be adjusted relative to the front face 4 of the bedknife so that the grinding wheel is in contact with front face 4 throughout the length of the bedknife regardless of its orientation within the frame of the mower.

FIG. 2 serves to illustrate in cross section an attachment magnet 12 attached to the bedknife 3. A broken line 22 shows the path of travel of the radially outer faces of the blades 2.

FIG. 1 shows an arrangement in which each magnet 12 is adjustably coupled to the guide rail 10 by means permitting adjustment of the magnet 12 in a direction perpendicular to that of the guide rail 10. In the illustrated embodiment each magnet 12 is adjustable relative to the guide rail 10 in two perpendicular directions relative to the guide rail 10. More particularly, the illustrated adjustment means permit movement of the magnets 12 in a direction parallel to the guide rail 10 and in a direction perpendicular thereto which is parallel with the bottom face of the bedknife 3 and enables the grinding wheel 5 to be moved towards and away from the front face 4 of the bedknife 3. Each magnet 12 is suitably associated with adjustment means comprising a slide member 13 slidable in a direction aligned with that of the guide rail 10 and releasably fixable in a plurality of positions. The slide member 13 is preferably releasably fixable in an infinite number of longitudinal positions. Preferably, the slide member 13 is slidable along the guide rail 10 and is releasably fixable thereto by clamping, as shown in FIG. 1 in which the slide member 13 comprises a pair of opposed plates 14, 15 between which the guide rail 10 (specifically one arm of the angle iron) may be releasably clamped, as by means of screws 16, for example.

The adjustment means suitably comprises two members movable towards and away from one another in a direction perpendicular to that of the guide rail. In the illustrated embodiment, therefore, there is shown a threaded rod 17 longitudinally fixed to a first member constituted by a bracket 18 fixed to one of the magnets 12. The rod 17 is freely rotatable and cooperates also with the second member constituted by a second bracket 19 extending from the slide member 13. The threaded rod 17 may be rotated manually to adjust the position of the second bracket 19 longitudinally of the rod 17 and thereby increase or decrease the separation of the first and second brackets 18 and 19 in a direction longitudinal of the rod 17.

Referring now to the embodiment illustrated in FIG. 3, the construction of which is as disclosed above with reference to FIGS. 1 and 2, the differences being highlighted below. The grinder wheel 117 is attached to the grinder wheel assembly 125 by means of tightening wing locking bolt 132. To alter the angle of the grinding face with respect to the bedknife, wing locking bolt 132 is loosened and the grinder 117 is rotated to the required position and then the wing locking bolt 132 is retightened. To move the grinding face to another position relative to the grinder wheel assembly 125, wing locking bolt 132 is loosened and the grinder 117 is moved in a direction towards or away from the assembly 125 to the desired position and wing locking bolt 132 is re-tightened. Handle locking bolt 126 connects a traverse carriage 124 to a slide member 113 by means of an unshown slot. In order to move the grinder wheel assembly 125/117 in a perpendicular direction to the slide member 113, for example forward or backward movement, the handle locking bolt 126 is loosened so the traverse carriage 124 can be moved forwards or backwards and the handle locking bolt 126 is tightened in a different position in the slot. The traverse carriage 124 also includes a vertically aligned slot 123 which receives the handle lock 134 to permit vertical adjustment of the grinder wheel assembly 125/117. Blade deflectors 111 are attached to the grinder assembly by wing lock 135.

The traverse carriage 124 is attached to a slide member 113 by handle lock 126. The slide member contains four roller bearing assemblies (comprising roller bearings 131, nuts 130, screws 137, bearings 129, 128). These bearings are positioned above, below and either side of the guide rail to enable movement along the guide rail to be precise.

Figure 4:
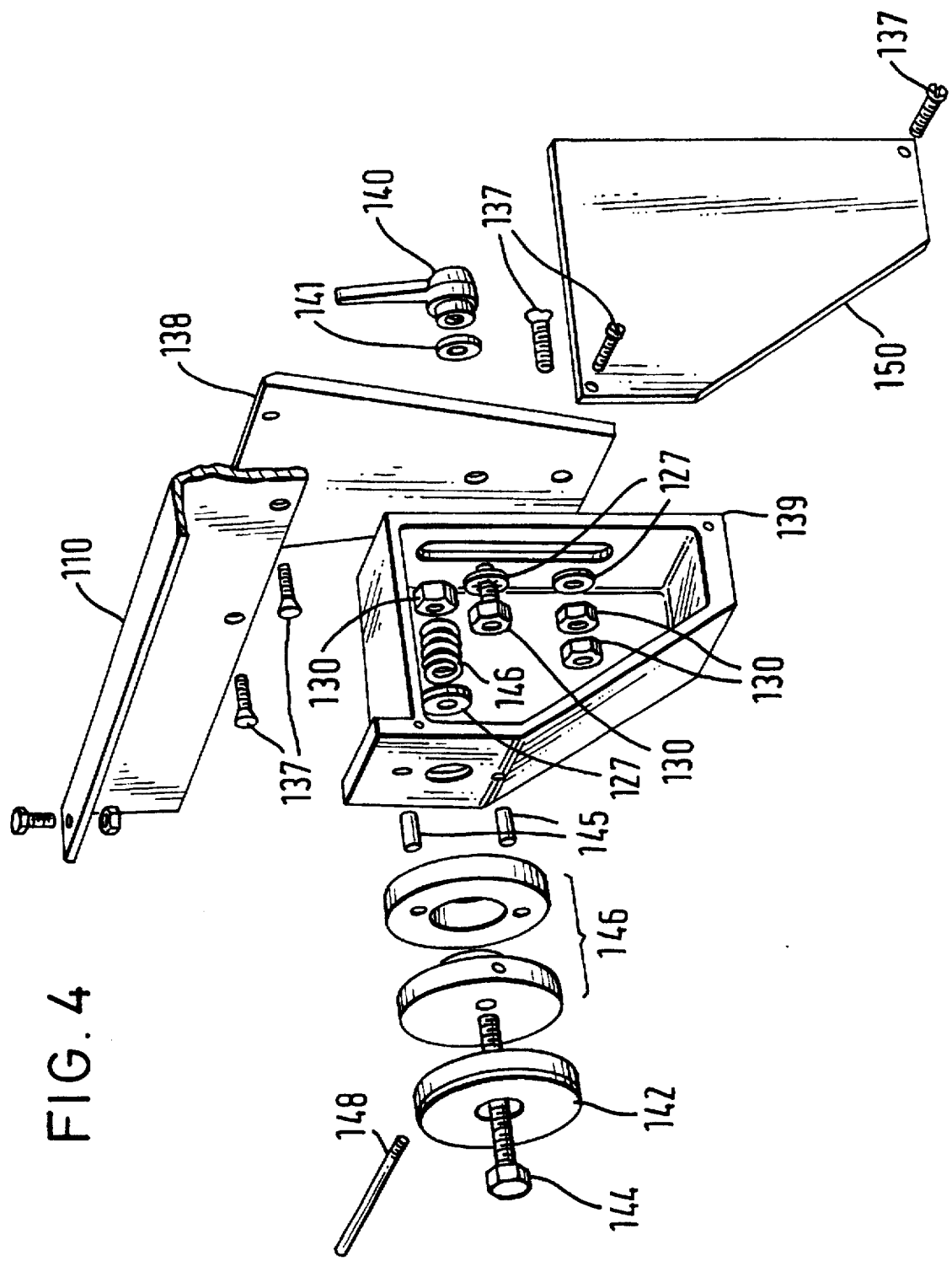
FIG. 4 is a partial perspective view of the attachment member the embodiment shown in FIG. 3, detailing the components in their respective positions prior to assembly.

Illustrated in FIG. 4 is an attachment assembly positioned at one end of the guide rail 110 for detachably connecting the invention to the mower. A corresponding assembly is positioned at the other end of the guide 110. Referring to FIG. 4 in more detail, the guide rail 110 is connected to support plate 138 which is movably connected to support bracket 139 by handle lock 140. Bi-directional movement of the guide rail 110 in a vertical plane is achieved by loosening handle lock 140.

A magnet 142 is connected to the support bracket by means of bolt 144. Interposed between the magnet 142 and support bracket 139 is a cam assembly 146. By means of a cam handle 148, cam assembly 146 is used to finely adjust the support bracket 139 in a vertical plane. Plate 150 encloses the central portion of the support bracket 139.

Preferred grinding machines of the invention are portable and releasably attachable to the underside of any complete mower, whether tractor mounted or pedestrian. The preferred grinding machines therefore permit the grinding of the bedknife of any mowing machine without the necessity for any disassembly of the mowing machine or for the mowing machine to be taken to and placed on the grinding machine. The novel grinding machine of the invention is therefore particularly advantageous for golf courses or municipal authorities possessing a multiplicity of mowing machines, possibly at different locations.

The invention includes a method of sharpening the bedknife of a reel mower, comprising orienting the complete mower to expose the bedknife, attaching to the mower a grinder of the invention, optionally adjusting the position of the grinder relative to the mower to enable the grinding wheel to grind the front face of the bedknife, and operating the grinding machine.

It will be understood that the grinding machine of the invention has been illustrated with reference to a specific embodiment and that numerous modifications are possible within the scope of the invention. The grinding machine of the invention is beneficial for sharpening any machine containing a linear blade, in cases wherein the grinding machine may advantageously be supported on the cutting machine to facilitate blade sharpening.

I claim:

1. A portable grinder for grinding the bedknife of a grass mowing machine which grinder comprises a guide rail with opposite ends, a grinding wheel assembly for receiving a rotary grinding wheel which assembly is mounted for movement to and fro along said guide rail, readily releasable attachment members for releasably securing the grinder on the mowing machine such that when said grinding wheel assembly is moved along said guide rail the grinding wheel can move along a blade face of said bedknife and grind it, wherein said grinding wheel assembly includes deflector means for automatically deflecting rotary blades of said mowing machine out of the path of movement of said grinding wheel in both directions of movement relative to said guide rail during movement of said assembly, first adjustment means being provided to adjust the position of said guide rail adjacent its opposite ends relative to said bedknife and second adjustment means being provided to adjust said grinding wheel assembly relative to said guide rail and hence relative to said blade face of said bedknife in a direction perpendicular to that of the guide rail.

2. A portable grinder according to claim 1 wherein said first adjustment means include means for varying the position of said attachment members in a first direction perpendicular to the longitudinal axis of the guide rail.

3. Portable grinder according to claim 1 wherein said first adjustment means include means for varying the position of said attachment members in a second direction perpendicular to the first direction.

4. Portable grinder according to claim 1 wherein said second adjustment means include means for rotationally displacing the grinder wheel assembly in a notional plane parallel to the longitudinal axis of the guide rail.

5. Portable grinder according to claim 1 wherein said second adjustment means include means for rotationally displacing the grinder wheel assembly in a notional plane perpendicular to the longitudinal axis of the guide rail.

6. Portable grinder according to claim 1 wherein said second adjustment means comprises adjustment means in a first direction perpendicular to the longitudinal axis of the guide rail.

7. Portable grinder according to claim 1 wherein said second adjustment means comprises adjustment means for displacing the grinder wheel assembly in a second direction perpendicular to the first direction.

8. Portable bedknife grinder according to claim 6 which includes adjustment means for varying the depth of grinding.

9. Portable grinder according to claim 1 wherein said attachment means comprises a plurality of magnets and cam means wherein said cam means are independently adjustable to alter the attitude of said guide rail.

10. A method of sharpening the bedknife of a reel mower, comprising orienting the complete mower to expose the bedknife, attaching to the mower a portable grinder which comprises a guide rail, a grinding wheel assembly for receiving a rotary grinding wheel which assembly is mounted for movement to and fro along said guide rail, including the steps of adjusting attachment means to orientate said guide rail relative to said bedknife so that it is substantially parallel thereto and adjusting said grinding wheel assembly to introduce deflector means to operate between the bedknife and an adjacent rotary blade of the mower and to bring said grinding wheel into position so that blade face of said bedknife can be ground throughout its length during which grinding process said rotary blade automatically is deflected during movement of said grinding wheel assembly.

11. Portable bedknife grinder according to claim 7 which includes adjustment means for varying the depth of grinding.

* * * * *